Figure 1:
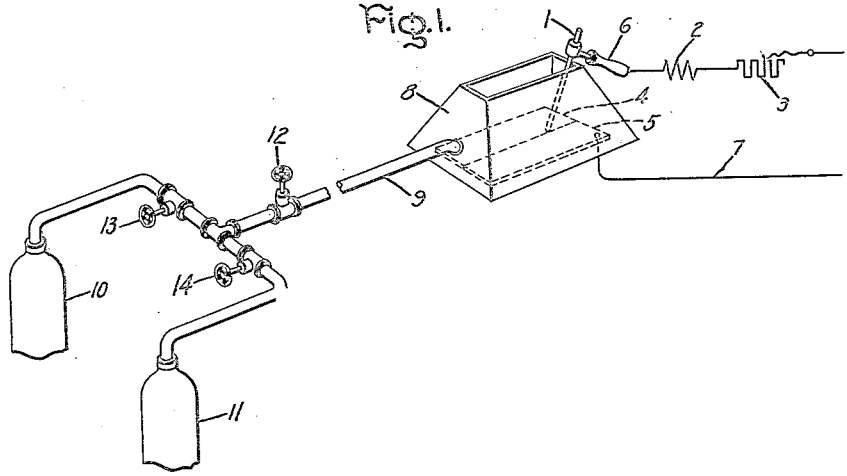

Feb. 4, 1930.                P. P. ALEXANDER                1,746,210
                              ELECTRIC WELDING
                         Original Filed Jan. 10, 1927

Inventor:
Peter P. Alexander,
by
His Attorney.

Patented Feb. 4, 1930

1,746,210

UNITED STATES PATENT OFFICE

PETER P. ALEXANDER, OF MARBLEHEAD, MASSACHUSETTS, ASSIGNOR TO GENERAL ELECTRIC COMPANY, A CORPORATION OF NEW YORK

ELECTRIC WELDING

Application filed January 10, 1927, Serial No. 160,087. Renewed January 6, 1930.

My invention relates to electric arc welding and particularly to metallic arc welding in the presence of hydrocarbons preferably in the form of a gas or mixture of gases which, in the presence of the arc, yield up carbon and enable the production of sound welds of great tensile strength.

In welding certain classes of work such, for example, as cast steels, it is desirable to deposit in the weld sufficient carbon to impart to the weld metal characteristics similar to those of the parent metal. It thus happens that it is found necessary at times to form a weld in which the carbon content may be as high as .2 to .3 per cent or over. Welding with special high carbon electrodes is difficult and, where deposits of high carbon content are desirable, the carbon content of the rod is so great that the arc becomes very wild. The difficulty is increased, furthermore, due to the fact that a certain amount of carbon is burnt out during the welding process which makes it necessary to use a rod the carbon content of which is much higher than otherwise would be required for producing a weld with the desired carbon content. For example, for the introduction of .2 to .3 per cent carbon into the weld, a rod of .5 to .6 per cent carbon content is necessary.

I have found that it is possible to introduce the desired amount of carbon into the weld by decomposing in an arc maintained in proximity to or in the vicinity of the weld a carbon compound that when heated thereby will liberate free carbon. The amount of liberated carbon can readily be controlled by controlling the amount and character of the carbon compound introduced into the arc for this purpose. I have found that propane is particularly useful. Propane is a chemical compound of carbon and hydrogen of the formula $CH_3CH_2CH_3$. In the arc this compound is broken up into its elemental constituents of carbon and hydrogen, the carbon being precipitated for the most part into the weld and the hydrogen forming a protective envelope about the arc. A certain amount of the carbon and hydrogen is oxidized by the oxygen of the air at the outer confines of the protective gaseous envelope about the arc forming water vapor and carbon dioxide. With the carbon supplied in this manner, it is possible to use in metallic arc welding a welding rod of low carbon content that will melt with great smoothness and deposit a sound weld free from porosity, for it has been found that a stable arc is an important factor in producing sound non-porous welds.

The deposited carbon has an additional effect which may best be understood from the following considerations. The molten steel in the crater of the arc absorbs large amounts of the gases surrounding the arc. All gases are soluble in the molten steel to a certain degree. At their boiling point metals are practically free from dissolved gases, but, as the temperature of the metal drops, the solubility at first rapidly increases to a maximum and then decreases until the freezing point is reached where, at the moment of the change from the liquid to the solid state, the solubility drops very abruptly. The result of this abrupt change in solubilities is that, during the freezing of the metal, very large volumes of gases are liberated in the mass of the metal, and, if not allowed to escape, are trapped and form numerous blow holes in the metal.

When iron is welded in air, an iron oxide is automatically formed on the surface of the molten metal which upon its formation liberates a great amount of heat which is absorbed by the top layer of the cooling metal and this added heat is sufficient to retard the freezing of this layer and help keep the surface in a molten state until the rest of the weld has passed into the solid state. This free surface allows the dissolved gases to escape freely from the weld and leave it practically free from blow holes.

But, when it is desired to produce a weld of high ductility, oxygen must be kept away from the crater. It has been proposed to weld in an atmosphere of hydrogen as described and claimed in my application Serial No. 758,082, filed December 26, 1924 for methods and apparatus for electric arc welding, assigned to the same assignee as the present application. In this case the oxidation reaction is entirely suppressed, and the solidification of the surface layer is retarded by direct radiation from the more powerful arc core, characteristic of an arc in hydrogen. The evolution of gas is likewise facilitated by the increased rate of deposition of metal which keeps the surface of the crater in a state of mechanical agitation.

One of the objects of the present invention is further to facilitate the liberation of gases from the weld metal by the presence of carbon which is precipitated on the surface of the crater of the arc saturating the upper layer of the metal and thereby lowering its freezing point as well as furnish free carbon that may combine with whatever hydrogen there may be present in the metal to form a hydrocarbon compound with the liberation of a certain amount of energy comparable to the energy liberated in air welding upon the formation of iron oxide. Thus by the addition of carbon the volume of the escaping gas is reduced and a certain amount of additional energy added which keeps the surface of the crater from chilling and trapping gas bubbles which would result in the formation of a porous weld.

As noted above, propane dissociates in the intense heat of the arc into its constituent elements, carbon and hydrogen. Thus there is always present at the weld a certain amount of hydrogen which will produce the beneficial results of a hydrogenated atmosphere described and claimed in my above identified patent application, Serial No. 758,082. If it is found desirable to decrease the amount of carbon deposited by the dissociation of propane or other suitable compound, the active agent may be diluted or the amount of the agent supplied to the arc may be decreased. If, for example, it is found desirable to maintain a protective atmosphere about the arc and molten portions of the weld, and at the same time to introduce a limited amount of the carbon liberating compound into the arc, a mixture of the protective substance and the carbon carrying substances may be supplied to the arc. I have used hydrogen to dilute propane when forming a weld according to this invention while still maintaining a protective atmosphere about the arc and molten portions of the work.

The application of my invention will be understood from the following description when considered in connection with the accompanying drawing, and its scope will be pointed out in the appended claims.

Figure 2:
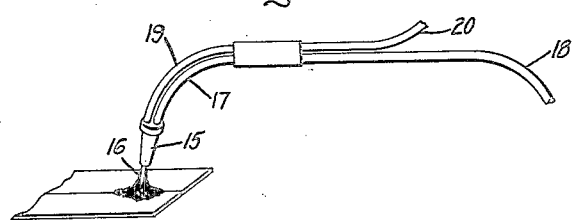

In the drawing, Fig. 1 diagrammatically represents my invention as applied to manual arc welding, and Fig. 2 represents my invention as applied to semi-automatic arc welding.

Fig. 1 diagrammatically shows one arrangement for hand welding in a gaseous atmosphere of hydrogen and propane. The electrode 1, which may be the usual low carbon metallic electrode, is indicated as connected to one side of a suitable source of supply through a reactor 2 and a resistor 3. The work, shown as a pair of plates 4 and 5, is connected to the other side of the source of supply by a conductor 7. The electrode is indicated as held by a suitable holder 6 adapted to be manipulated to cause the arc to be established and maintained between the electrode and the work during the welding operation. In order to simplify the drawing, the source of supply is not shown, but it may be a constant potential source where a series stabilizing resistor such as 3 is used. The source may be, however, an inherently regulated generator which may supply the arc without the use of a stabilizing resistor. A hood 8 of suitable material is shown as covering the work. An asbestos hood or a metal hood provided with a covering of asbestos or the like and having an opening therein is satisfactory. The hood may be comparatively small and cover but a portion of the work. Its purpose is to exclude atmospheric air from the arc and the molten portions of the work and to maintain the desired gaseous envelope about the arc and work. The hood has an open top which is only sufficiently large to permit the operator to manipulate the electrode readily. The gaseous medium is conducted to the hood through the conduit 9 from gas containers 10 and 11, one of which, according to my present invention, contains propane and the other of which may contain hydrogen. A valve 12 is provided for controlling the supply of gases to the receptacle 8, and suitable means illustrated by the valves 13 and 14 are provided for adjusting the mixture of the gases to produce the proper atmosphere within the receptacle. For welding in mixtures of propane and hydrogen, the valves 13 and 14 will be suitably adjusted and, when it is found desirable to weld in pure propane or pure hydrogen, the other gas may be shut off by closing the appropriate valve. It will be apparent that my invention is in no wise limited to the particular apparatus described.

Fig. 2 shows the application of my invention to semi-automatic welding apparatus which may be, for example, of the general type disclosed in Letters Patent to Paul O. Noble, No. 1,508,711, September 16, 1924. In this type of apparatus, means are provided for automatically feeding the electrode to the work to maintain the arc. Since such means form no essential part of my invention, they have not been shown in the figure. The figure shows an electrode delivery and gas discharge nozzle 15 through which an electrode 16 may be advanced toward the work by suitable means. The nozzle contains or has associated therewith a passageway adapted to be connected with the gas supply through a conduit 18. This conduit may be a flexible hose. Any suitable construction may be used which maintains the desired gaseous envelope about the arc and work. The electrode may be guided to the tool through a flexible guide tube 20, which may have the welding lead incorporated therein. If desired, the parts 20 and 18 may be combined into a unitary structure. The curved piece 19 may be a small pipe of brass or the like through which the electrode is fed and with which it makes good contact as it is forced around the curve. The part 17 is an extension of conduit 18 and may be either a small piece of pipe or a piece of flexible hose which may be bound against the pipe 19.

In view of the disclosure in Fig. 2 of a suitable means for semi-automatic arc welding, it is believed that it is unnecessary to show and describe my invention in a fully automatic machine where the electrode is automatically fed to the work to compensate for its consumption and automatic means are provided for producing relative movement between the arc and the work along the line of the joint to be welded.

A one inch plate of cast steel, welded in an atmosphere of 85 per cent hydrogen and 15 per cent propane with Roebling wire showing on analysis a carbon content of 0.16 per cent, by depositing several beads in the V formed by the prepared edges of the plates, which was subsequently reduced by forging to 3/4″ and from which test bars were cut, gave the following results:

| Test bar # | Yield point pounds per sq. inch | Tensile strength pounds per sq. inch |
|---|---|---|
| D | 61,625 | 83,750 |
| E | 63,310 | 85,560 |

| Elongation in per cent in two inches | Reduction in area in per cent | Remarks |
|---|---|---|
| 23.5 | 50.01 | Broke in weld. |
| 18.5 | 31.48 | Broke in weld. |

An analysis for carbon content of the plates and the weld metal showed:

Plate_____ .27 of 1 per cent
Weld metal_____ .23 of 1 per cent

The embodiments of the invention illustrated and described herein have been selected for the purpose of clearly setting forth the principles involved. It will be apparent, however, that the invention is susceptible of being modified to meet different conditions encountered in its use. For example, in order to control the amount of carbon introduced by the above process, carbonic acid gas might be added as a diluent. It has already been proposed to weld in mixtures of carbon dioxide and propane, the gases being present in suitable proportions to yield upon dissociation and recombination in the presence of the arc a resulting gaseous mixture of carbon monoxide and hydrogen as described and claimed in the application of Elihu Thomson, Serial No. 52,680, filed August 26, 1925, for electric welding, and assigned to the same assignee as the present application, but the present invention differs from that invention by requiring an amount of propane sufficient to yield a deposit of carbon in the weld metal for the accomplishment of the purposes above set forth. I have also found that nitrogen may be used with propane, if propane is present in sufficient amounts to yield, upon dissociation, an amount of hydrogen, which is so related to the traces of oxygen present at the arc and molten portions of the metal that the harmful effects of nitrogen in the presence of oxygen are neutralized. If, for example, a mixture of 95 per cent nitrogen and 5 per cent propane is used, the results obtained are substantially the same as those obtained when welding in a mixture of 20 per cent hydrogen and 80 per cent nitrogen with the added effects secured through the addition of the precipitated carbon, since every molecule of propane will produce, upon dissociation, 4 molecules of hydrogen and at the same time release free carbon according to the present invention. Welding in mixtures of nitrogen and hydrogen has beenn described and claimed in the application of Irving Langmuir and myself, Serial No. 54,637, filed September 5, 1925, for methods and apparatus for electric arc welding, assigned to the same assignee as the present application. It is of course apparent to those skilled in the art that other suitable substances may be used in the place of propane. For example, natural gas may be used, or any hydrocarbon, which will decompose in the arc after vaporization if not already a gas with the liberation of free carbon. It may be found desirable to introduce other elements into the weld, and for this purpose composite weld rods or suitable amounts of the alloying metal placed in the prepared seam before welding may be used.

The application of Irving Langmuir, Serial No. 729,185, filed jury 30, 1924, for heating process and apparatus, assigned to the same assignee as the present application, discloses and claims method and apparatus for producing atomic hydrogen and carrying it over to the work where it is recombined, liberating heat. Whether or not heating of the work by the recombination of dissociated hydrogen may under certain circumstances be present to some extent when my invention is used, I make no claim to such subject matter since the Langmuir invention is earlier than my invention.

What I claim as new and desire to secure by Letters Patent of the United States, is:

1. The method of metallic arc welding which comprises maintaining an arc from a fusible weld rod of low carbon content and supplying carbon to the weld metal by introducing into the arc a hydrocarbon compound which will dissociate in the arc with the liberation of free carbon.

2. The method of carburizing a weld which comprises maintaining an arc in the vicinity of the weld and supplying about the arc to the exclusion of air a hydrocarbon compound which is decomposed in the arc with the liberation of free carbon.

3. The method of carburizing metals by the electric arc process which comprises maintaining an arc in proximity to the metal and supplying propane to the arc.

4. The method of carburizing a weld produced by the metallic arc process which comprises maintaining an arc between a weld rod of low carbon content and the work and supplying to the arc a hydrocarbon compound which will dissociate in the arc with the liberation of free carbon.

5. The method of arc welding which comprises maintaining an arc in proximity to the work to be welded and supplying to the arc a mixture containing propane and hydrogen.

6. The method of arc welding which comprises maintaining an arc between the work and an electrode adapted to be fused and deposited in the weld and maintaining about the arc and fused portions of the weld a gaseous medium dissociable in the arc to produce hydrogen and a predetermined amount of free carbon to control the carburization of the weld.

7. The method of arc welding which comprises maintaining an arc between the work and an electrode adapted to be fused and deposited upon the work and maintaining about the arc a hydrocarbon gaseous medium containing another gas as a diluent in proportions such that free carbon results so as to control the density and carbon content of the deposited metal.

8. The method of arc welding which comprises maintaining an arc between the work and an electrode adapted to be fused and deposited upon the work and producing about the arc a gaseous mixture of a hydrocarbon and nitrogen, the hydrocarbon being dissociable in the arc to produce hydrogen and free carbon the proportions of the hydrogen and nitrogen being such that a sufficient amount of hydrogen is present to neutralize the effect of the oxygen of the atmosphere when welding in the open air.

In witness whereof, I have hereunto set my hand this seventh day of January 1927.

PETER P. ALEXANDER.